Feb. 27, 1962 A. FLAGGE 3,022,939
REGISTER-CONTROLLED MEANS FOR CONTROLLING
AND ACTUATING RECORDING APPARATUS
Filed Aug. 6, 1956 8 Sheets-Sheet 1
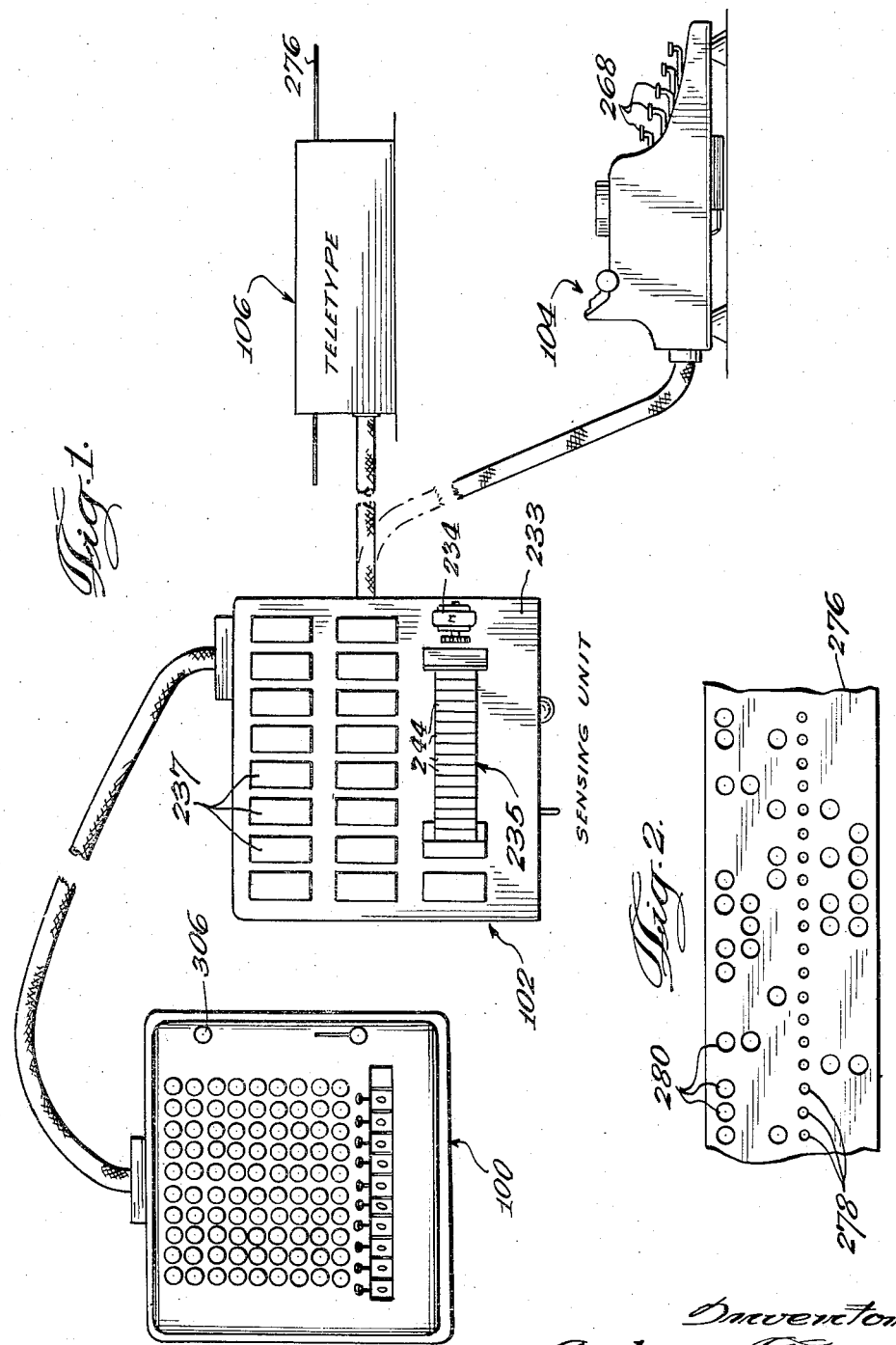

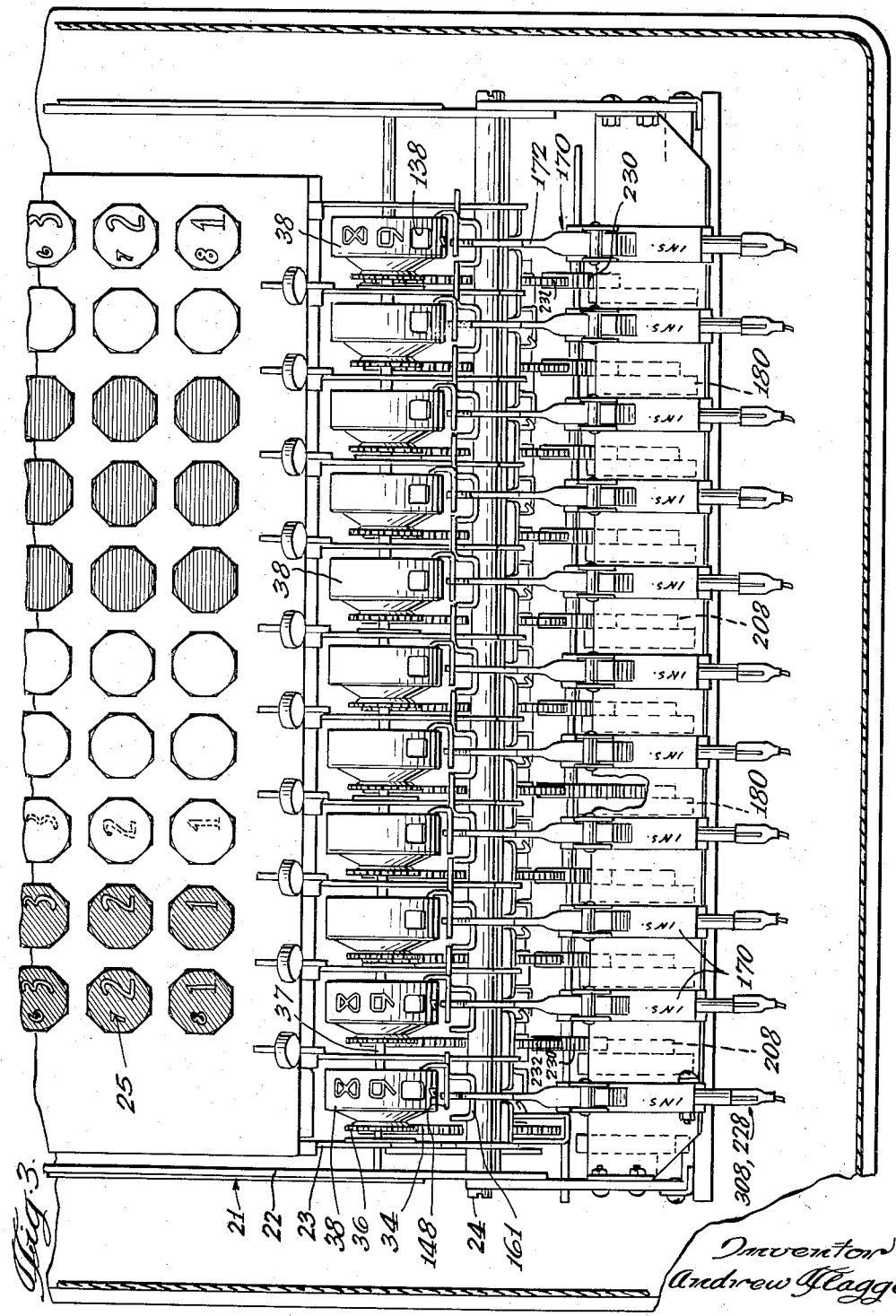

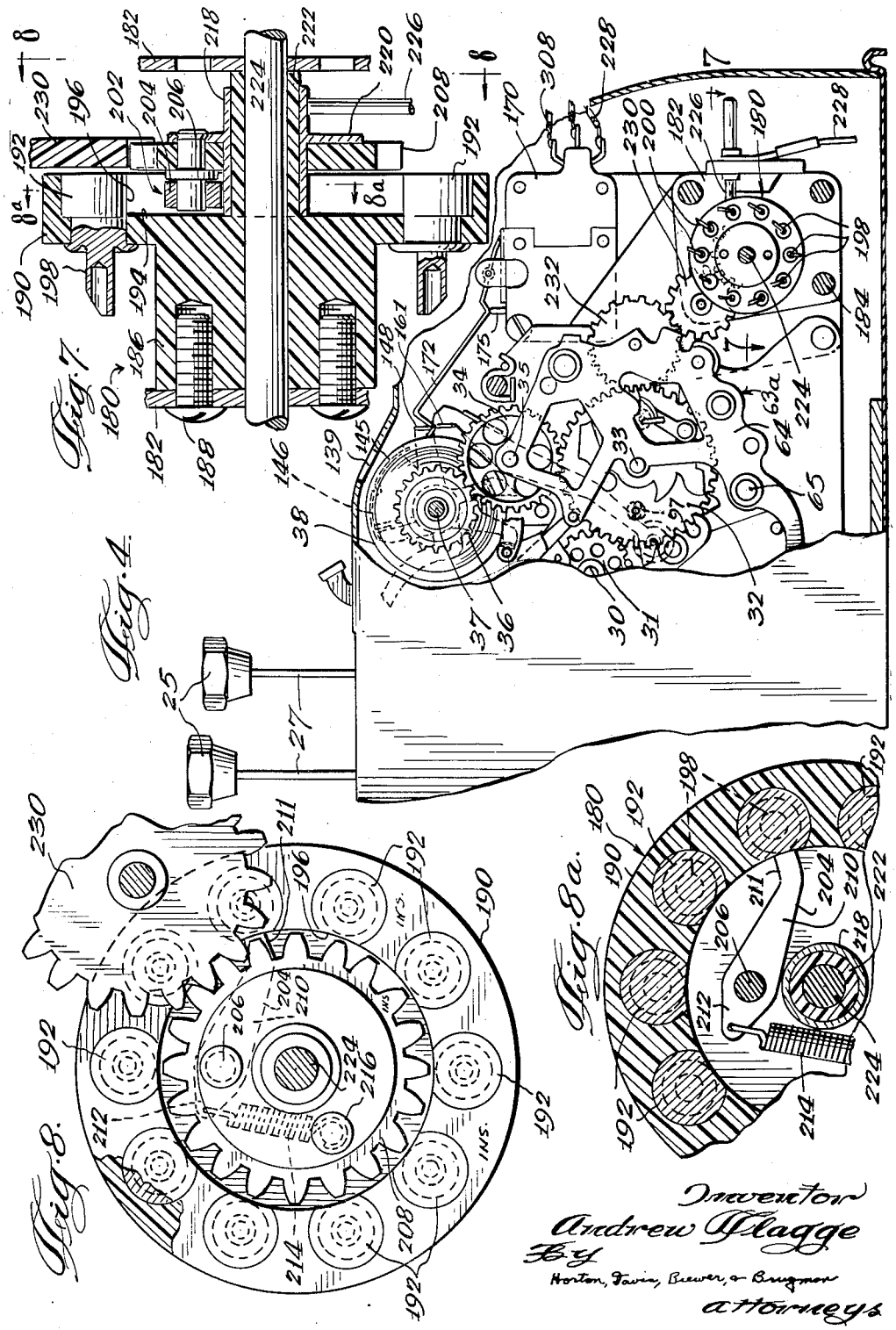

Feb. 27, 1962 A. FLAGGE 3,022,939
REGISTER-CONTROLLED MEANS FOR CONTROLLING
AND ACTUATING RECORDING APPARATUS
Filed Aug. 6, 1956 8 Sheets-Sheet 5
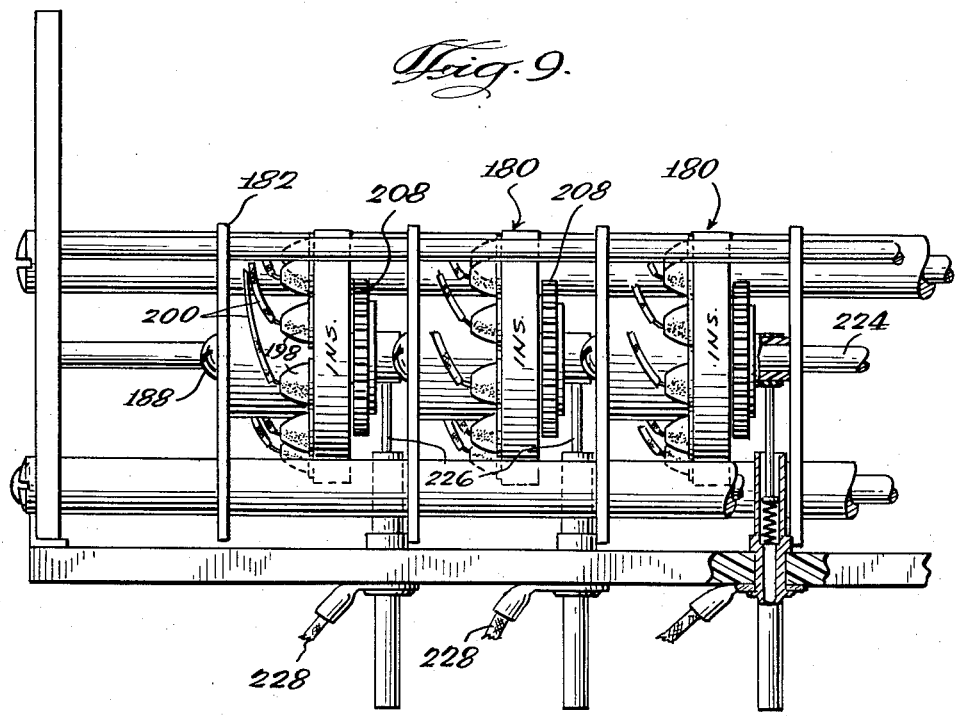
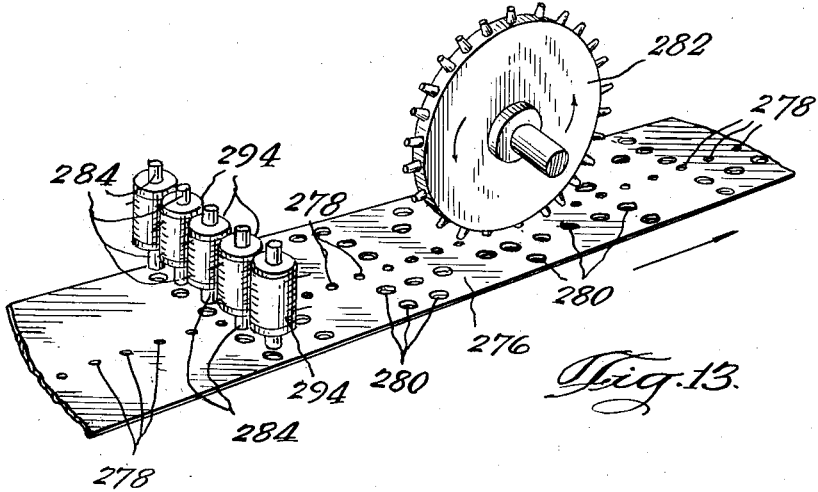
Inventor
Andrew Flagge
By Horton, Davis, Brewer & Brugman
Attorneys

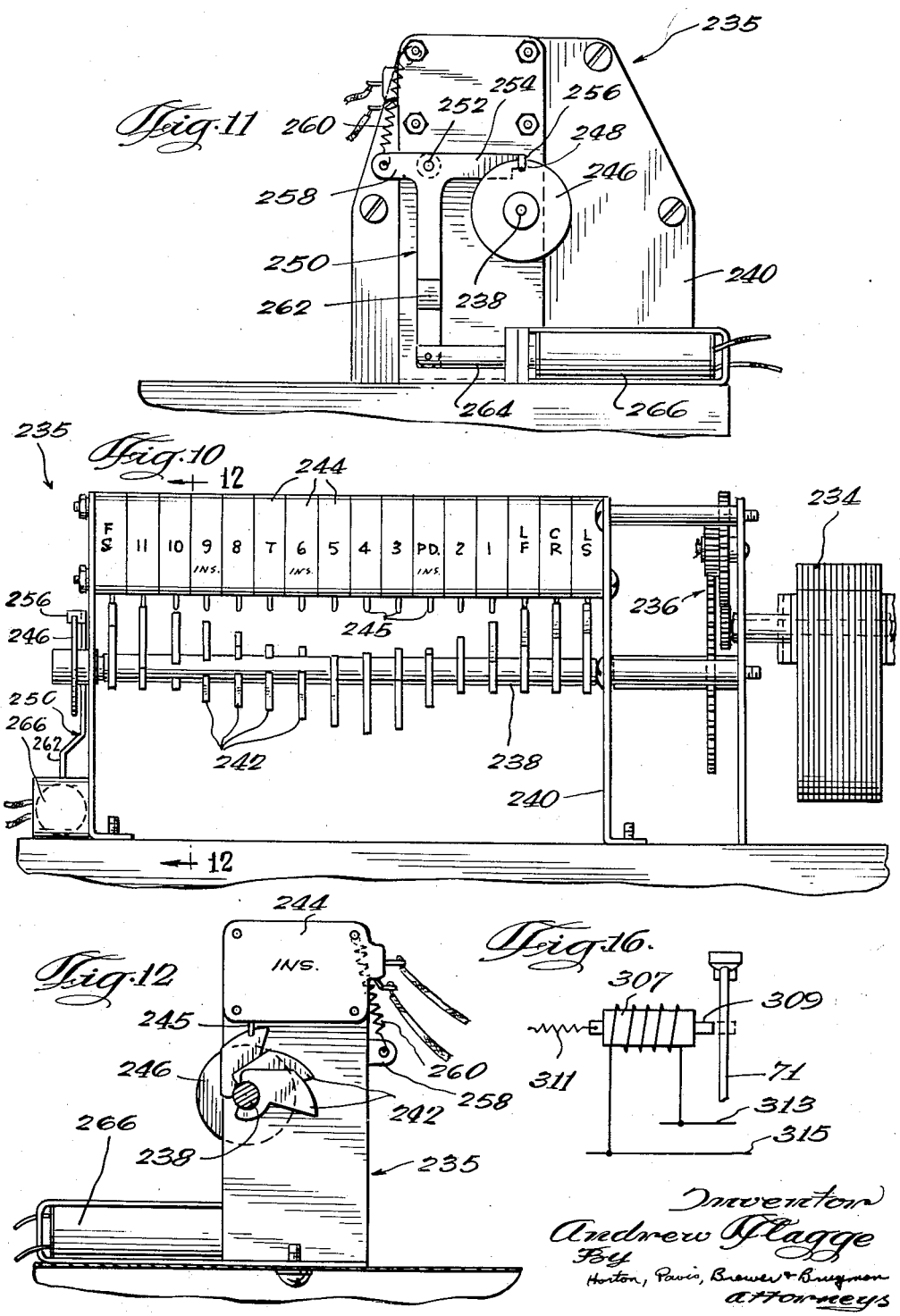

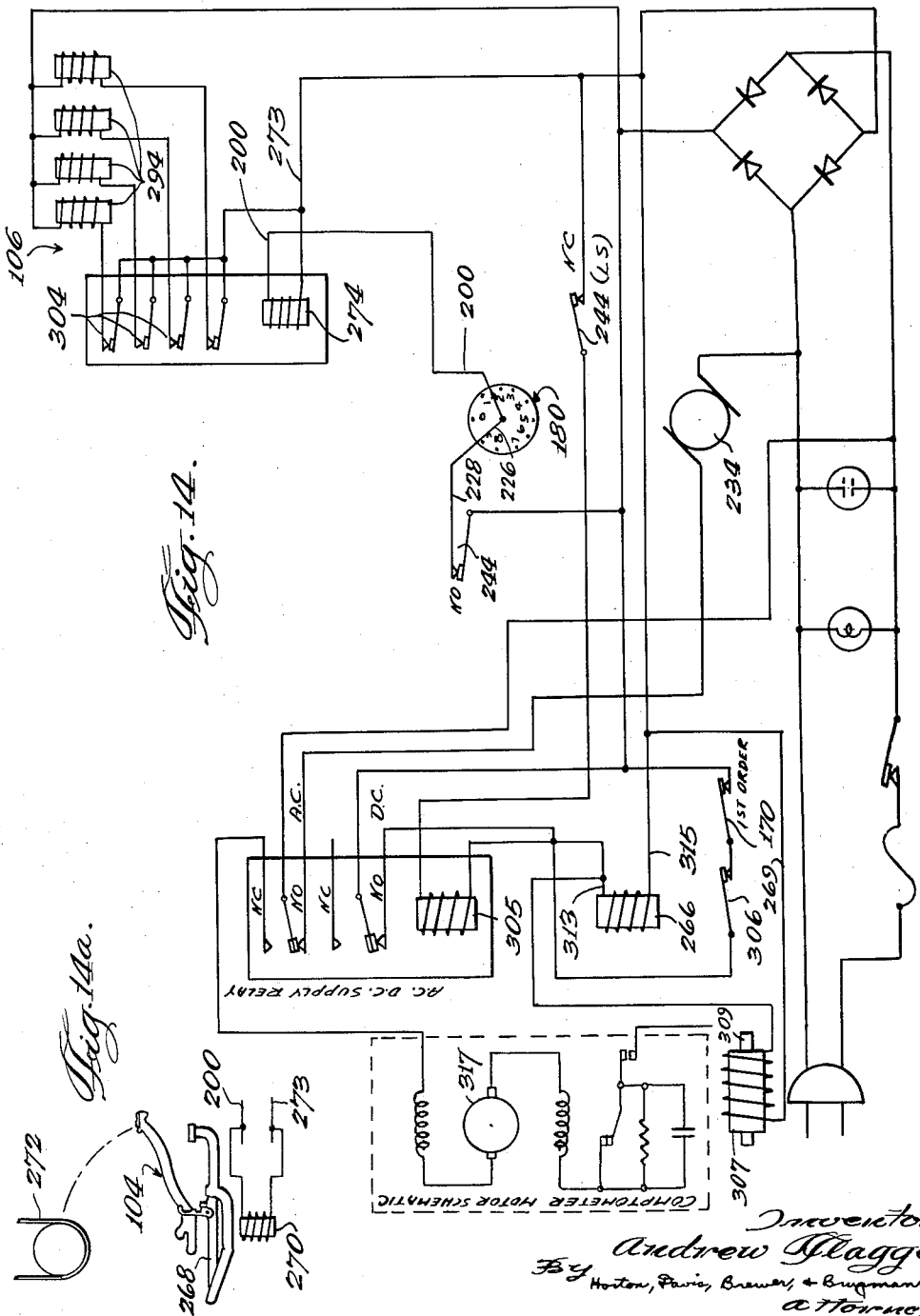

Inventor
Andrew Flagge
By Horton, Davis,
Brewer & Brugman
Attys.

United States Patent Office 3,022,939
Patented Feb. 27, 1962

3,022,939
REGISTER-CONTROLLED MEANS FOR CONTROLLING AND ACTUATING RECORDING APPARATUS
Andrew Flagge, Glen Ellyn, Ill., assignor, by mesne assignments, to Victor Comptometer Corporation, Chicago, Ill., a corporation of Illinois
Filed Aug. 6, 1956, Ser. No. 602,122
11 Claims. (Cl. 235—59)

This invention relates in general to business machines, and has more particular reference to apparatus for transferring a number from a register to a recording apparatus.

Many occasions arise where writing is being performed in a recording machine, such as a typewriter and it is desired to make calculations of figures involved in such writing. For example, the total of itemized charges may be desired. They may be totaled in a calculating machine and the total transferred manually pursuant to visual observation. Such procedure however is quite time consuming and it constitutes a source of error due to the human factor.

It is an object of the present invention to provide novel and improved apparatus for expeditiously transferring numbers from a calculating machine to a writing or other recording machine and recording them in the latter.

Another object is to provide apparatus for the purpose stated in which the transfer of the numbers is made without the necessity of zeroizing the calculating machine.

A further object is to provide apparatus or mechanism of the foregoing character in which only the significant digits of the result from the calculating machine are transferred, and none of those to the left of the significant digits are transferred; in realizing the present aspect of the invention, the apparatus incorporates means for cooperating with the construction embodying the invention of Patent No. 2,346,601, issued April 11, 1944, to Felt and Tarrant Manufacturing Company (now Comptometer Corporation), the assignee of the present invention.

Another and more specific object is to provide apparatus producing the effect stated immediately above, in which all orders of the calculating machine to the left of the significant digit orders are read and appropriate impulses transmitted to the receiving or recording portion of the apparatus so that the record medium (paper, punched tape, etc.), is moved or shifted so as to align successive numbers in column form according to the respective denominational orders.

Still another object is to provide apparatus of the character noted in which the transfer of the numbers from the calculating machine to the record medium is under control independent of the other functions of the calculating machine, whereby observations of the results may be made before or after transfer, if for any reason such should be desirable.

A still further object is to provide novel apparatus or mechanism of the character noted in which the results are transferred serially by digits, whereby to utilize such devices as a typewriter or punched-tape mechanism in which characters, such as represent digits, are recorded individually and serially in coordination with moving or shifting of the record medium.

Another object is to provide apparatus for recording numbers transferred from a calculating machine, which can be easily adapted to such calculating machine and controlled by the operation thereof, without in any way affecting the otherwise normal and original functioning of the calculating machine.

Another object of the invention has to do with its use with a "Teletype" or other machine which utilizes a punched tape, the tape being punched according to a certain code, i.e., the particular arrangements and combinations of punches represent certain characters. The punches may furthermore represent certain kinds or series of characters, such as numerals, letters, etc., according to the attitude of the machine; for example, a certain combination of punches may represent the numeral "2" in one attitude of the machine and the latter "W" in another. In manual use of the machine, the operator must shift it so as to represent the intended character. In accordance with the foregoing, such machine, when utilized with a calculating machine in practicing the present invention, must be shifted so as to properly designate numerals. However, if this requirement were left to recollection of the operator, it may be inadvertently overlooked. It is therefore another object of the present invention to provide apparatus or mechanism in which the "Teletype" machine is automatically moved or shifted to designate numerals before the calculation results are transferred, and automatically shifted to a return attitude upon completion of the recordation operation.

Other objects of the invention will become apparent from the following description and claims and are illustrated in the accompanying drawings which by way of illustration show a presently preferred embodiment of the invention.

In the drawings:

FIGURE 1 is a diagrammatic illustration or layout of the instruments used in practicing the invention;

FIG. 2 is a view of a portion of a punched tape used as a record medium in the "Teletype" machine;

FIG. 3 is a plan view of a portion of a calculating machine, with a portion of the interior exposed, embodying certain features of the invention;

FIG. 4 is a side view of the device of FIG. 3, also showing a portion of the interior;

FIG. 7 is a large scale sectional view taken on line 7—7 of FIG. 4 and showing the construction concerned, from one denominational order;

FIG. 8 is a view taken on line 8—8 of FIG. 7;

FIG. 8a is a sectional view taken on line 8a—8a of FIG. 7;

FIG. 9 is a plan view of switches of FIGS. 7 and 8, of several denominational orders;

FIG. 10 is an elevational view of the read-through means;

FIG. 11 is an end view from the left of FIG. 10;

FIG. 12 is a view taken on line 12—12 of FIG. 10;

FIG. 13 is a view showing in simple diagrammatic form a means for punching tape;

FIG. 14 is a circuit diagram of one denominational order of the mechanism;

FIG. 14a is a diagrammatic view of a portion of a typewriter and the manner of connecting it in the circuit of FIG. 14;

FIG. 16 is a view of a means for preventing zeroizing of the calculating machine during transfer of information therefrom.

Figure 5:
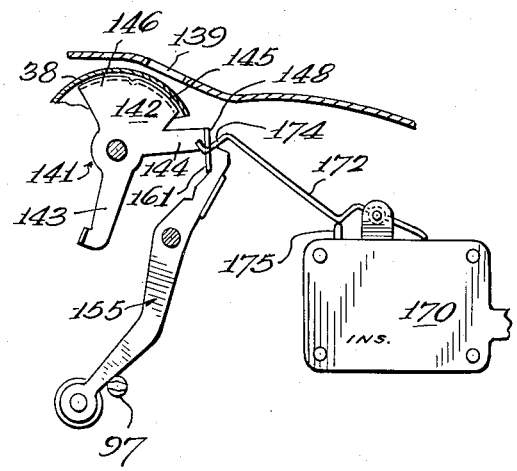
FIG. 5 is a schematic arrangement of certain elements lifted from FIG. 4, in one position of operation.

The various parts of the apparatus or mechanism embodying the invention are represented in FIG. 1 and include a calculating machine 100, a sensing unit 102, and receiving or recording machines, for example a typewriter 104 and a "Teletype" machine 106 which utilizes a punched tape type of recording medium. The invention may be practiced by the use of either the typewriter or "Teletype" machine, or both, as will be brought out in detail later.

So that the invention may be more fully understood, it may be helpful to explain by way of example one of its uses. It will be understood however that the mechanism is capable of other uses.

Assume the typewriter is used in making up bills. In such an operation, various charges are itemized and entered on a bill, and it is then necessary to obtain a total of the charges. This may be done of course mentally, and the total entered manually, but such a method is quite time consuming, and even if the total is obtained in a separate calculating machine, it is quite time consuming, and in addition there is the ever present source of error in transcribing the total by observation and manually writing or typing. In the present instance, the charges may be entered in the calculating machine and a total obtained, and the total then transferred automatically to the paper in the typewriter. A similar situation exists in the case of the "Teletype." This machine may be used for recording information of various kinds (in code) and when it is desired to obtain a calculation, such as a total, it is obtained in the calculating machine 100 and automatically transferred to the "Teletype," with the same general effect as in the case of the typewriter. Thus in the practical use of the apparatus in a business operation, the typewriter or "Teletype" may be considered a principal machine and the calculating machine a supplementary machine.

The embodiment of the invention, for illustrative purposes, includes a multiple order calculating machine of the type known in the art as the "Comptometer," although the invention is not limited or restricted thereto. Pertinent details of construction of that type of calculating machine are disclosed in United States Letters Patent Nos.:

Turck, 1,357,748, Nov. 2, 1920
Turck, 2,063,962, Dec. 15, 1936
Niemann, 2,346,601, Apr. 11, 1944

The detailed disclosure of that machine will not therefore be repeated herein. Instead only so much thereof as will aid in an understanding of the invention as illustrated will be described herein, and reference is hereby made to such patents for a full and complete description of the illustrated calculating machine.

The "comptometer" calculating machine incudes, among others, two well-known types, namely the key-actuated type, and the key-responsive motor-driven type. In the former, depression of the digital key initiates operation of a mechanical means for advancing the numeral wheel an amount corresponding to the value represented by the particular key depressed. In the latter, depression of the digital key effects energization of the driving motor and sets up means for advancing the numeral wheel in response to operation of the motor and to an amount corresponding to the value represented by the particular key depressed. These two types are disclosed in the above-mentioned Patents Nos. 2,346,601 and 2,063,962, respectively. In both cases, the numeral wheel is advanced in response to depression of the digital key, and to that extent they may be considered similar in so far as the present invention is concerned since the transfer and recording apparatus is, in effect, controlled by the movement of the numeral wheels. Actually it is controlled by another medium that controls the movement of the numeral wheels, but the relation in this respect is the same whether in the key-actuated, or key-controlled motor-driven type of machine. In the former case, all operation is mechanical, and since the apparatus of the present invention involves an electric circuit, a source of electricity and circuit may be incorporated as a simple expedient, while in the latter case, since a source of electricity is present, such may be utilized in the apparatus of this invention. Also, in connection with the latter case, the motor-drive feature is utilized in disabling the calculating machine during transfer of information from the calculating machine to the recording portion of the apparatus, as will be described more fully hereinafter.

As disclosed in the above-mentioned Patent No. 1,357,748, the illustrated actuating, accumulating, and zeroizing or clearing means are supported in a casing 21 by a suitable frame. That frame comprises side skeleton plates 22, spaced intermediate skeleton plates 23, and transverse tie-rods 24 suitably securing the plates 22 and 23 together in spaced relation.

It will be understood by those skilled in this art that in such a multiple order machine a plurality of keys 25 are arranged in a suitable number of columns or rows, for example 10 columns of 9 keys each, and an overflow order without digital keys. The keys of each column preferably bear the ordinal numerals of 1 to 9. They are adapted to actuate, or control the actuation of, depending upon which of the types above referred to is utilized, the accumulating apparatus through the agency of their depending stems 27 and a plurality of key operable column actuators (not shown) one of which is provided for each column of keys. At the forward oscillatable end each column actuator is provided with a rack which meshes with an accumulator pinion (not shown) loosely mounted for rotation on a transverse shaft 30 suitably journalled in the skeleton frame.

In addition to the accumulator pinion, the accumulator means for each denominational order of the machine, or for each column of keys 25, includes a transmitting pinion or gear 31 rotatable on the shaft 30, a pawl and ratchet mechanism (not shown) for drivingly connecting the accumulator pinion with the transmitting gear 31 when the former is rotated during the up stroke of the column actuator, a carrying gear 32 rotatable on a transverse shaft 33 and adapted to mesh with the transmitting gear 31, an intermediate gear 34 rotatable on a transverse shaft 35 and in mesh with the carrying gear 32, a numeral wheel gear 36 rotatable on a transverse shaft 37 and in mesh with the intermediate gear 34, and a numeral wheel 38 fixed to the numeral wheel gear 36 for rotation therewith on the shaft 37. The numeral wheels 38 are of hollow construction and the peripheral flange of each bears the cardinal numerals of 1 to 9. The shafts 30, 35, and 37 are suitably supported by the skeleton frame in fixed relation with one another, and the shaft 33 is carried in a swinging frame 63a including spaced partition plates 64 and connecting tie-rods 65. The swinging frame carrying the shaft 33 is mounted for limited pivotal movement on the fixed shaft 35 to permit movement of the carrying gears 32 from meshing relationship with the respective transmitting gears 31 in zeroizing or clearing the register. The gear train including the gears 31, 32, 34, and 36, and their operation, are common to the two types of calculating machine referred to above.

During downward movement of any column actuator, the pawl and ratchet between the accumulator gear and the transmitting gear 31 have relative movement, and hence no motion is transmitted to the gear train including the transmitting, carrying, intermediate, and numeral wheel gears. During the return or up stroke of any column actuator, however, the pawl and ratchet between the accumulator gear and the transmitting gear 31 are drivingly related, and hence the numeral wheel associated with that column actuator is rotated sufficiently to indicate an amount determined by the digital value of the key 25 which was employed to depress the column actuator.

In the illustrated machine the means employed for the zeroizing or clearing of the numeral wheels 38 comprises, as will be understood by reference to the above mentioned Patent No. 1,357,748, a spring associated with each carrying gear 32 and wound thereby during calculation. When the swinging frame is swung about the shaft 35 in a direction to move the carrying gears from meshing relationship with the transmitting gears 31, the springs, by rotating the carrying gears, the intermediate gears from meshing relationship with the transmitting previously operated numeral wheel 38 to its zero position. For controlling the movement of the carrying gears from meshing relationship with the transmitting gears, a suitable zeroizing lever or operating handle is utilized (see handle 71 of Patent No. 1,357,748 and FIG. 16 herein), but the chain of connection between that lever and the carrying gears is omitted from the present disclosure for the sake of brevity, since the details thereof may be found in the patent mentioned. Suffice it to say here that when the zeroizing lever is swung in appropriate direction, the swinging frame 63a is swung forwardly about the shaft 35 to move the carrying gears 32 out of mesh with the transmitting gears 31. In this position the springs hereinabove referred to operate the carrying, intermediate, and numeral wheel gears to return any previously operated numeral wheels to their initial or zero positions. They are stopped in such positions by stop arms which are projected into the path of either of a pair of diametrically positioned zero stop pins 97 (FIG. 4) on each carrying gear 32 by the above-mentioned apparatus for moving the carrying gears out of mesh with the transmitting gears 31.

As brought out in the above-mentioned Patent No. 2,346,601, it is desirable to visually distinguish the denominational orders of the calculating machine significant in, and therefore to be read as a part of, the answer or result registered in the machine, from every other denominational order in the machine. For example, if a result turns out to be a number such as 4000051, where a number of ciphers occur to the right of the highest significant digit, the operator in reading from right to left, as is customary, may notice a series of ciphers and not follow them to the "4" and hence conclude that the result in the example given would be –51–. In order to prevent such occurrence, means is provided for visually distinguishing all ciphers to the right of the highest significant digit, or, in the case given, all those between "4" and "5."

The present invention incorporates the advantages of the foregoing concept and hence the mechanism includes a calculator embodying the features of the patent mentioned. The present mechanism includes structure cooperating or tying in with the structure of the calculating machine mentioned. The structure of that patent will not be described in detail herein, but certain aspects thereof will be referred to in order to describe its function in the practice of the present invention.

The structure of that patent referred to, involves the numeral wheels 38 and the usual sight apertures 139 (FIG. 4 herein) through which the numerals on the wheels are visible. The cipher indices on the numeral wheels, instead of being impressions of the usual cipher, are apertures 138 (FIG. 3), preferably in the accepted shape of a cipher, and means is provided under the apertures for rendering the indices visible. This means takes the form of an indicator device 141, or shutter (FIGS. 4, 5, and 6), one of which is provided for each order, and mounted for oscillation on the shaft 37. The indicator device is stamped or otherwise provided with three radially extending portions called respectively a sector or significant-digit indicator 142, a resetting arm 143, and a latching arm 144. The sector 142 has an arcuate lateral flange disposed within the numeral wheel 38 and divided into a blanking portion 145 and a visual indicating portion 146. The blanking portion 145 of each sector 142 is given a color preferably the same as that of the peripheral faces, or background, of the numeral wheels, 38, and the visual indicating portion 146 is given a bright distinctive color, preferably the same as that of the numerals on the wheels, which would of course contrast with that of the wheels, to indicate or register a blank and a cipher index, respectively, when in registration or coincidence with the cipher-shaped aperture 138 of the corresponding numeral wheel.

Figure 6:
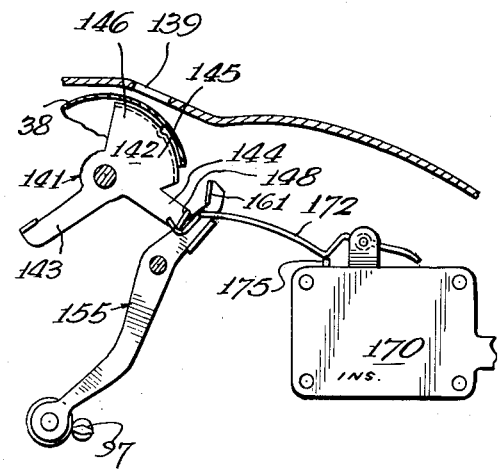
FIG. 6 shows the elements of FIG. 5 in another position.

Briefly stated, when the elements are disposed as in FIG. 5 the blanking portion 145 is in register with the cipher aperture 138 in the numeral wheel and with the sight aperture 139, but when disposed as in FIG. 6, the visual indicating portion 146 is in register therewith. In the first case the sameness of color of the portion 145 and the numeral wheel produces a blanking effect, while in the second case, the contrast between the color of the portion 146 and the numeral wheel indicates a zero, or a significant digit. The arrangement is such that in the case of the result given above —4000051— the contrasting color portion 146 would show in each order between the "4" and the "5," while to the left of the "4," the blanking portion 145 would be in register with the cipher aperture in each order.

The indicator device 141 is normally held in the blanking position of FIG. 5, in which the lateral flange 148 on the latching arm 144 rests on an arm portion 161 of the latch lever 155 which is controlled by a zero stop pin 97 on the carrying gear 32. Upon rotation of the lever 155 clockwise from the position of FIG. 5 to that of FIG. 6, as is done in the operation of the machine, the arm portion 161 is withdrawn from under the flange 148, and the indicator device 141 snaps to the position of FIG. 6, under the influence of a spring (not shown). It is in connection with this construction, and function thereof, that means is provided for eliminating non-significant digit zeros in the recording operation of the present invention. This means includes switches 170, one for each order, suitably mounted on the frame of the machine, and having a control arm 172 with a hook portion 174 engaged between the flange 148 and arm portion 161. The switch is shown in open position in FIG. 5, with the control arm raised, but when the indicator device 141 moves from the position of FIG. 5 to that of FIG. 6, the control arm is lowered to close the switch by depressing the pin 175 in the switch. The switch is of known type, and is included in the circuit described hereinbelow. The flange 148 is extended in length, as compared with the corresponding element in Patent No. 2,346,601, mentioned above, to facilitate engagement with the hook portion 174 of the switch. In the operation of the calculating machine, when any one of the indicator devices 141 is moved to "indicating" position, i.e., that of FIG. 6, all those to the right of that one also are so moved, as fully described in the patent mentioned, regardless whether in any of those orders to the right, a number of 1 to 9, and not 0, shows. These indicator devices actuate the switches 170 in those orders, whereby these orders are rendered significant in the recording operation, as will be described fully hereinbelow. When the switches are so closed by the indicator devices, they remain closed until the calculating machine is zeroized when the indicator devices are restored to normal or non-indicating position, after which they open.

Mounted on the frame of the calculating machine is a plurality of rotary or commutator switches 180, one for each order of the machine, for actuation by the same means that actuates the numeral wheel 38 of the respective order. The switches are conveniently mounted in a bank or assembly on a plurality of spaced plates 182 mounted on tie-rods 184 (FIG. 4) extending across the machine, with spacer elements between the plates. The end ones of the plates may be secured to suitable elements of the frame of the machine. The physical structure of the switches may assume any of a number of forms, but preferably includes a block or body 186 (FIG. 7) of suitable insulating material such as a known plastic, bolted to the respective plate 182 as at 188. The body has an enlarged end portion 190 in which are embedded ten contact elements 192 distributed around a central cavity 194. In accordance with desired manufacturing practices, the contact elements 192 are provided with contact surfaces 196 formed by boring the cavity 194 thus providing such surfaces of substantial area. The contact elements have extensions 198 projecting through the body and connected with leads or wires 200. Each switch has a central brush or contact member 202 constituting the portion of the switch directly responsive to and movable by the numeral wheel actuating means. The contact member 202 includes an arm 204 pivotally mounted on a pin 206 which is mounted in a gear 208, eccentric to the axis of the gear. The arm 204 has a long arm 210 the extended end 211 of which forms a brush or contact element engageable sequentially or serially with the contact elements 192 in its rotation in the operation of the switch. Opposite the long arm 210 is a short arm 212 to which is connected a tension spring 214 the other end of which is anchored to a stud 216 mounted in the gear 208. The spring biases the long arm outwardly into engagement with the contact elements 192. The gear 208 is of suitable insulating material, such as plastic, and mounted on a hub element 218 of conducting material, such as metal. The hub element has a flange 220 engaged by the pin 206, the construction also serving to furnish a unitary assembly of the contact member 202, gear 208, and hub element 218. The hub element is mounted on a sleeve or bushing 222 of insulating material, the latter being mounted on a rod 224 common to all the switches 180, extending transversely of the machine and supported by the plates 182. The bushing 222 may be dimensioned for engaging the switch body 186 at one end and the adjacent plate 182 at its other end, to restrain axial movement thereof. A common contact element 226 leads from the hub element 218, having conventional construction for sliding contact therewith in the manner of a brush (FIGS. 7 and 9). It will be understood that the arm 210, pin 206 and hub element 218 are all of conducting material, forming electrical connection between the contact elements 192 and the contact element 226. The contact element 226 continues to wire 228 (FIGS. 14 and 15) for the respective order, which leads to the respective switch 244. In the case of the first order, the wire 228 is connected directly to the switch 244, but in all higher orders, the switches 170 are interposed in the wires 228. The switches 170, in all but the first order are double throw switches and are utilized for selectively connecting the wires 228 to the respective switches 244 and to other parts of the circuit as explained more fully hereinbelow.

The rotary switches 180 are actuated by the gears 230 (FIG. 4) which mesh with gears 208 on the switches, and with gears 232, the latter meshing with the carrying gears 32. The gears 230 are rotatably mounted on a shaft suitably supported by the plates 182, and the gears 232 are rotatably mounted on a shaft in the rock frame 63a. In the operation of the calculating machine, as explained in the afore-mentioned patents, the numeral wheels are rotated to positions corresponding to the denominations of respective keys 25 depressed, by means of the carrying gears 32 which are then in mesh with the transmitting gears 31, acting through the intermediate gears 34; in this operation, the carrying gears 32 also serve to actuate the switches 180, through the gears 232 and 230.

The rotary switches 180, as noted above, have ten contact elements 192, and these correspond to the numerals of the numeral wheels, namely, 1 to 9 and 0. Stated in another way, these contact elements correspond to respective positions of the numeral wheels and are put in circuit according to the values indicated by the positions of the wheels. The rotary contact members 202 are rotated the same extent as are the respective numeral wheels, engaging the contact elements 192 corresponding to the numerals displayed by the numeral wheels, one contact element corresponds to the numeral "1," another to the numeral "2," etc. In zeroizing the calculating machine, as explained above, the gears 32 return the numeral wheels to zero position; these gears in the same operation also return the switches 180 to zero position. Thus the switches are both advanced to set positions and returned to zero positions by the same means that actuates the numeral wheels to those positions. Accordingly, for convenience, the switches will be referred to as being controlled by the numeral wheels. For convenience in mounting the switches, wires 200 (FIGS. 9 and 15) connected to the contact elements 192 may lead to bus bars 231 extending across the machine, the contact elements of all the switches corresponding to a given value being connected to a common bus bar.

In the operation of transferring information from the calculating machine to the receiving or recording device, (e.g., typewriter or "Teletype") the information so transferred includes that determined by the positions of the rotary or commutator switches 180, and after the setting of the switches pursuant to a calculation operation in the manner explained above, the switches are read or sensed by the sensing unit 102. This sensing unit is shown diagrammatically in FIG. 1, and includes a suitable container or case 233 on which a rotary reading or cycling device 235 is mounted and which has a plurality of emplacement sections 237 for receiving certain electrical relay instruments referred to below. Attention is directed particularly to FIGS. 10–12 for a showing of a preferred form of physical construction of the reading device 235. A read-through motor 234, which is preferably an induction motor of known form, is connected through reduction gearing 236 to a shaft 238 rotatably mounted in a suitable frame 240. Mounted securely on the shaft for rotation therewith is a plurality of cams 242 aligned with the same number of switches 244, of known type, and arranged for actuating those switches by engaging the pins 245 thereof. The cams 242, as seen in FIGS. 10 and 12 are staggered around the shaft seriatim, and they are so disposed and relatively spaced that a given switch is operated and passed over to enable it to return to its normal position before the next switch is operated. Specifically, all of the switches, except the last one to the right—"LS," are closed by the cams and they return to normally open position, while the action of the "LS" switch is reversed. The switches, and their cams, number sixteen in the present case, and include one for each of the overflow and ten denominational orders of the calculation machine, plus additional ones as explained in detail below.

The cam shaft 238 rotates through one revolution in one cycle of operation of transferring information, and is positively retained in a stationary home position between cycles. A suitable device for accomplishing this effect includes a disc 246 mounted on the shaft 238 and having a notch 248. Cooperating with the disc is a latch lever 250 pivoted as at 252 and having an arm 254 with a detent 256 engageable in the notch 248; a second arm 258 having a tension spring 260 connected to it and to the frame for biasing the lever clockwise for latching the detent 256 in the notch 248 when otherwise enabled to do so; and a third arm 262 pivotally connected with the armature 264 of a solenoid 266. The arrangement is such that energization of the solenoid 266 rotates the latch lever 250 counterclockwise (FIG. 11) and removes the detent 256 from the notch 248, enabling the cam shaft 238 to be rotated by the motor. Upon de-energization of the solenoid, the spring 260 returns the latch lever to move the detent again into the notch. The sequence of operation of these elements will be described in detail hereinbelow.

Pursuant to operation of the sensing unit 102, the desired information is transferred to the receiving or recording device, e.g., either the typewriter 104 or the "Teletype" machine 106, or both when both are employed in the system. Considering first the typewriter 104, this may be a standard typewriter, having keys 268, equipped with solenoids for actuating certain of the keys. Referring to FIG. 14a, one such key 268 is shown in association with a solenoid 270. The key acts as an armature and is attracted by the solenoid when the latter is energized whereby the key is actuated and the impression made on the record medium 272, or sheet of paper, in the same manner as when the key is actuated manually. The solenoids do not interfere with the manual actuation of the keys. In the mechanism for carrying out the principles of the present invention, solenoids are provided for such keys as the numeral keys, the period key, etc., and also for the spacing key, line spacer or paper feed keys, shift key, etc. It will be understood that these examples are illustrative and not limiting, it being well-known to provide various operating parts with electrically operated actuating elements.

The typewriter, when included in the apparatus, is connected in the circuit of FIG. 14. Attention is directed to the solenoid 274 in FIG. 14, which is included in the "Teletype" machine 106 for functioning in a manner described in detail hereinbelow. The solenoid 274 is connected across the leads 200 and 273, and as will be noted from FIG. 14a, the solenoid 270 is connected across the same leads, or, in parallel with the solenoid 274, when both the typewriter and "Teletype" are used. Thus it will be seen that either the typewriter or the "Teletype" machine alone, or both of them together, may be included in the apparatus.

As mentioned above, the "Teletype" machine 106 is of the punched-tape kind. Such tape is shown at 276 in FIG. 2, and includes a longitudinal series of preformed feed apertures 278, and code apertures 280 formed in a coding operation, such as herein. This type of machine is well-known, but it may be stated briefly that the code apertures 280 are arranged in transverse rows, in various combinations. The various combinations of apertures represent different characters. The tape is punched in a machine such as that (106) of this mechanism, and decoded in a companion machine in which the apertures enable, for example, contacts to be made therethrough for actuating type keys. In the latter machine, the combinations of apertures represent different kinds of characters dependent upon the attitude of the machine. For example, in one attitude a certain combination of apertures may represent the letter "W" and in another attitude, the numeral "2." In order therefore for the machine to properly interpret the coding, it must be in the proper attitude. In order to eliminate possibility of error due to human factor, the machine is automatically shifted to the proper attitude before recording information from the calculating machine—that to register numerals—since it is numerals that are to be transferred from the calculating machine. After completion of a cycle of operation, it is automatically shifted again to the counterpart attitude such as that for registering letters.

FIG. 13 shows schematically a simple device for punching the tape, the particular form of which does not constitute an essential of the invention, and hence any of various forms may be used. In the device illustrated, the tape 276 is fed by means of a toothed wheel 282 engaging in the preformed feed apertures 278. The wheel 282 is rotated intermittently, an angular distance in each actuation corresponding to the space between feed apertures. The tape is punched for forming the code apertures 280 by means of a series of punches 284 of suitable type. Such punches may for example be formed on the armatures of solenoids 294, and are actuated upon energization of the solenoids. Five such solenoid-punches are provided, arranged in a transverse row across the tape, and are actuated variously, singly, in different groups, or all together, according to the code utilized. Such is well-known to those skilled in the art, and as well-known is the specific sequence of punching and feeding, namely the tape is fed intermittently one increment equal to the space between feed apertures after each punching operation. The means for actuating the feed wheel 282, and the means for synchronizing its operation with the punching operation may be conventional and are believed not to require detail treatment herein. The punch solenoids 294 are controlled individually through switches 304 (FIG. 14) forming a relay with the solenoid 274. The solenoids 274, a plurality of which are provided as explained below, are energized selectively according to the character (e.g., numeral) to be transmitted, or function to be performed. The relays 274, 304 may conveniently be mounted in the sections 237 in the sensing unit 102.

Figure 15:
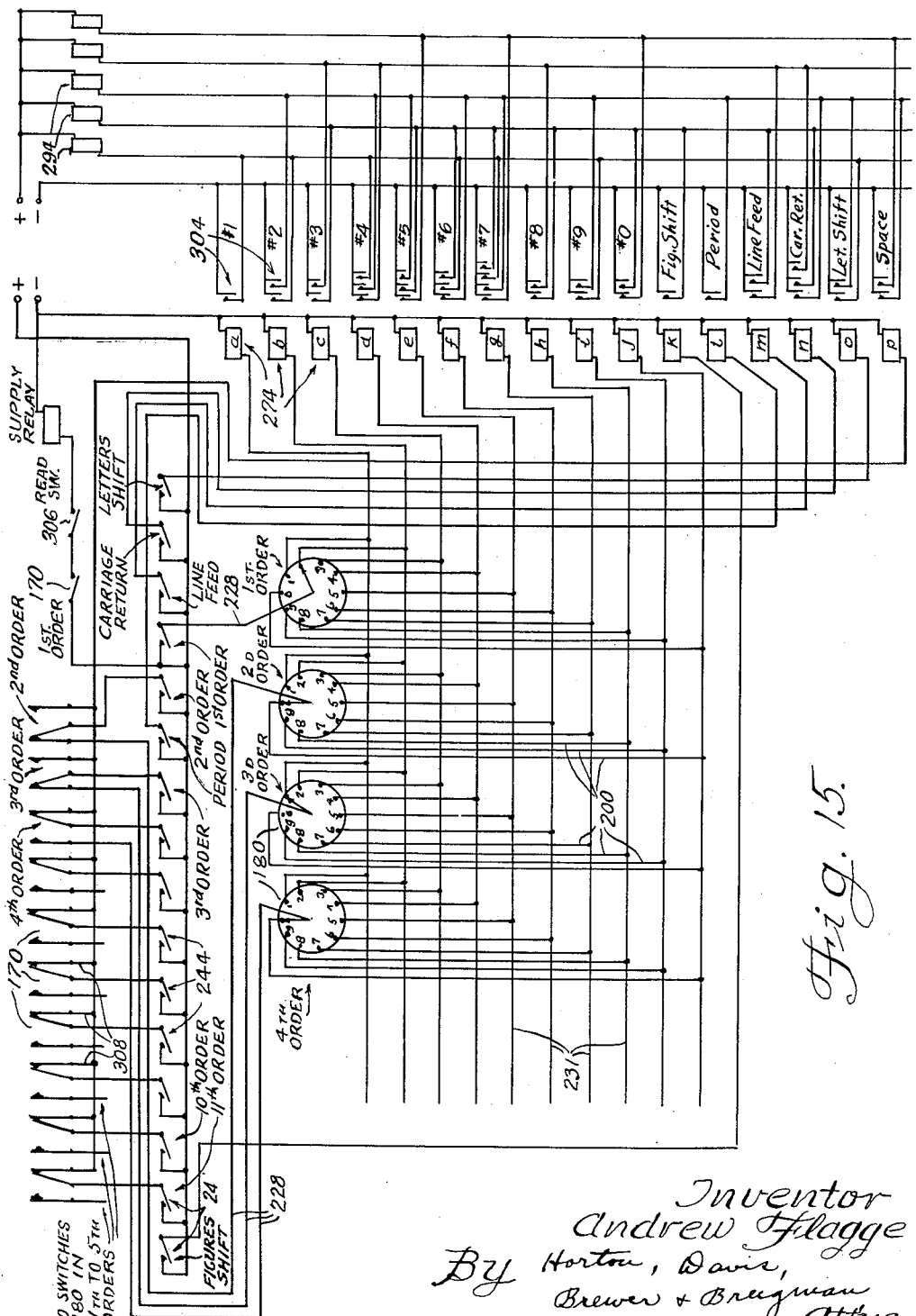
FIG. 15 is a diagram of certain circuit portions related to the first four orders of the calculating machine, and including circuit portions relating to fixed functions.

Reference is next made to the circuitry of FIGS. 14 and 15, and to the mode of operation. The circuitry illustrated assumes a total indicated by the calculating machine of 102 (or 1.02), i.e., the three lowest orders contain the significant digits. Recalling the example of use of the apparatus given above, suppose an operator made certain entries of individual items in the typewriter 104, and wishes a total thereof. The said items are manually entered in the calculating machine and a total obtained. The total in this case is 102; the rotary switches 180 for the first three orders are set by, and to positions corresponding to, the respective numeral wheels 38. Transfer of the total is effected by closing of the read-through or transfer switch 306 (see FIGS. 1, 14 and 15), pursuant to which the rotary reading device 235 of FIG. 10 is operated. Attention is directed to FIG. 14 which shows the circuit for one denominational order of the mechanism. Assume the circuit of FIG. 14 applicable to the lowest or units order and it is desired to transfer information from the calculating machine to one of the recording devices; the operator closes the read-through switch 306; the switch 170 of this order has been closed, as will appear from the description of FIGS. 5 and 6, this being a significant-digit order; the arresting solenoid 266 (FIG. 11) is energized, releasing the detent 256 from the notch 248 and enabling the cam shaft 238 to be rotated; the read-through motor 234 is actuated and upon rotation of the cam shaft, the switch 244 for the first order is closed (together with other operations being performed); in the rotary switch 180, the circuit is closed through the contact element 192 corresponding to the "2" numeral; the solenoid 270 in the typewriter (FIG. 14a) corresponding to the "2" key is closed; if the "Teletype" machine 106 is utilized, the appropriate solenoid 274 is energized for closing switches 304 controlling the solenoids 294 in the necessary combination for representing the numeral "2" in the punched tape.

As noted above, five solenoids 294 and punches are utilized for punching the various codes in the tape. These are shown in FIG. 13, but the apertures 280 are not all in full groups of five, but in groups of different numbers according to the codes represented. FIG. 14 shows only four solenoids since the character appearing in the order concerned is represented in the punched tape by four apertures. FIG. 15 includes all five of the solenoids, and circuitry connecting the various solenoids in groups with the corresponding terminals in the switches 180.

The switch 244 (LS), (FIG. 10) as mentioned above is normally closed, and in the cycling operation the relay solenoid 305 is energized, as will be seen from the circuit (FIG. 14); at the end of the cycling operation, the switch 244 (LS) is momentarily opened by its cam (FIG. 10), and the arresting solenoid 266 is de-energized, thus enabling the spring 260 (FIG. 11) to move the detent 256 into the notch 248.

In a cycling operation, consisting of one revolution of the cam shaft 238, all of the orders are read or sensed, even those that are not set up, such as the 4th to 11th orders in the example given. In addition to the functions performed in relation to the orders set up, certain other functions are performed that are invariable and the same in every cycling operation regardless of the orders that are set up. The reading device 235 of FIG. 10, includes sixteen switches 244, and corresponding cams, all of which are operated during a cycle. These switches, reading from left to right, are "Figures Shift"; 11th to 3rd denominational orders, respectively; "Period"; 2nd denominational order; 1st denominational order; "Line Feed"; "Carriage Return"; and "Letters Shift." All of those circuits other than for the denominational orders are energized in every cycling operation. In those circuits are provided solenoids 274 operatively arranged for performing the desired machine movements, for example, carriage return, line feed, etc., which are performed by known electrically controlled movements.

The "Figures Shift" and "Letters Shift" switches 244 are disposed at the first and last positions respectively, in the bank of switches. These are used particularly in the case of the "Teletype" machine 106; as stated above, this device interprets according to the attitude it assumes, and since only figures are concerned in the present instance, the "Figures Shift" shifts the machine to the proper attitude for interpreting figures before any other operations are performed, and then after all those other operations are so performed, the "Letters Shift" operates to shift the machine to interpret letters. The arrangement thus eliminates the necessity for memory on the part of the operator for manually performing the function.

After reading the "Figures Shift" switch, the 11th to 3rd orders are read, serially. Next the "Period" switch is actuated, in accordance with indications of monetary designations. After the period, are the second and first order readings, and the "Line Feed" and "Carriage Return" readings and corresponding operations, followed by "Letters Shift" referred to above.

The position of the switches 170 determines performance of function related to the denominational orders. These switches (except in the first order) are in series with the commons 228 to the rotary switches 180 (FIGS. 14 and 15) and so long as they (170) are open, no functions for impressing character representations are performed. Since they are closed by the indicator devices 141 (FIGS. 5 and 6), they remain open so long as these indicator devices are not actuated, and hence no transfer is made of numerals (ciphers) in the orders to the left of the highest significant digit. However, in the case of the 2nd order in the case given, although a cipher is registered, the switch 170 is closed by the indicator device which is actuated in each order where a cipher appears in a significant digit.

As used above, the switches 170 when "closed" are closed to the rotary switches 180. When "open" to the latter switches, and in an opposite position, they contact wires 308 leading to the solenoid 274 associated with mechanism for effecting a spacing operation, which in FIG. 15 is designated as "p" or SPACE solenoid. The manner in which the spacing operation is accomplished depends upon whether the typewriter or the "Teletype" machine is concerned, in view of the fact that the operation performed in the typewriter is performed directly by the present apparatus, while, on the other hand, in the case of the "Teletype," a code is utilized for effecting a spacing operation, because the spacing operation is actually performed in a read-out device which utilizes the tape punched in the present apparatus.

In the case of the typewriter, the wires 308 lead to the solenoid 270 associated with the spacer bar. Thus whenever an order is read in the reading out operation which does not have a significant digit, the corresponding switch 170 is closed to the respective wire 308 leading to the solenoid 270 associated with the spacer bar. Hence, in those orders in which no character, such as a number, is represented a spacing operation is performed.

In the case of the "Teletype" machine, since the punched tape is to be utilized in a counterpart read-out machine, no spacing operation, as such, is performed in the present apparatus. Actually for a "spacing operation" a code punch is performed similar to the codes of characters represented, such as numbers, and when the punched tape is utilized in the read-out machine for controlling the operation thereof, the intended spacing operation is performed under the control of the code corresponding to that spacing operation.

Thus whether an actual spacing operation is performed as in the typewriter or a spacing code brought about, the end effect in transcription of the information is similar. Stated in another way, every signal impulse generated in the apparatus is reflected in the "Teletype" in the form of a code element, and the code element, when used later in the read-out device, is translated into the character represented, or function performed. In the typewriter, all information is recorded directly, and all other functions performed immediately. In both cases the operation of the calculating machine and sensing device is identical.

The spacing operation of the apparatus enables tabulation of vari-digit figures. Given a starting position for the highest order, for each non-significant digit a spacing function in the typewriter (or "Teletype") is performed, and the numbers of each order are aligned in a column. In the significant digit orders, the spacing operation is performed in the typewriter, or code element recorded in the "Teletype" in accordance with the inherent nature of operation thereof.

A cycle of operation of the reading device 235 (FIG. 10) and other portions of the apparatus in the specific example given, namely, where the total of 102 is registered in the numeral wheels, is as follows: the cam shaft 238 makes one revolution; the first cam 242 closes the corresponding switch 244 "Figures Shift" in which the "Teletype" machine is shifted to a figures attitude; next the switches 244 for the 11th to the 4th denominational orders are closed sequentially in that order, with the result that the spacing bar in the typewriter is actuated and the spacing code representation is punched in the "Teletype," once for each order, the switches 170 in these orders being closed to the wires 308 (FIG. 15); following this, the switch 244 for the 3rd order is closed, energizing the solenoid 270 for the numeral "1" key in the typewriter and solenoid 274 for the same character in the "Teletype"; then the switch 244 for the period is closed, energizing the corresponding solenoids 270 and 274; next the 2nd and 1st orders are read with results similar to that of the 3rd order; then the "Line Feed" switch 244 is closed, energizing the respective solenoids 270 and 274 for feeding the paper in the typewriter one line and punching a code in the "Teletype" to effect similar operation; following this is the "Carriage Return" operation controlled by the corresponding and next following switch 244 with respectively similar functions performed in the typewriter and "Teletype"; finally the last switch 244 is opened, "Letters Shift," shifting the "Teletype" machine 106 to the attitude for interpreting letters, this operation also opening the circuit and terminating the cycle of operation (FIG. 14). It will be understood that the operations such as feeding the paper in the typewriter in line-to-line direction, returning the carriage, etc., may be done manually by the operator of the typewriter, as well as automatically by the calculating machine and sensing means.

The switch 170 for the 1st order (FIG. 15) is a single throw switch and arranged in series with the switches 170 of the remaining orders. In any result that may be registered in the calculating machine, the first order will be a significant digit, and when the first order switch 170 is closed, the cycling of the sensing means will read all of the denominational orders regardless of the number of digits in the result. If this switch is open, as when no result is registered, closing the switch 306 will simply result in no operation. In this case (the 1st order) it is not necessary for the switch 170 to include connection with the spacer control means.

It will be evident that the recordation of the information from the calculating machine is made serially from order to order, as contrasted with a simultaneous operation. Hence accommodation is made for serial-digit character impression made by a typewriter. A similar operation is utilized in the "Teletype" machine.

If it should be so desired, provision may be made for locking the zeroizing means of the calculating machine during the transfer operation, so as to prevent recording a possibly erroneous result, as if the numeral wheels should be rotated while the transfer is being made. The zeroizing lever 71 (FIG. 16) is swung about a pivot adjacent its lower end for zeroizing, and means may be provided for blocking this movement. FIG. 16 shows a suitable means for producing this result. In that figure, a solenoid 307 has an armature 309 extendable to the dotted line position when the solenoid is energized and retracted by the spring 311 when the solenoid is de-energized. When in extended position, the armature blocks the zeroizing lever 71 from being swung in zeroizing direction. The solenoid is connected in parallel with the solenoid 266 (note connections to wires 313 and 315 to which the solenoid 266 is also connected—FIG. 14) and remians energized throughout the cycling operation, as will be understood from the description above concerning the circuit of FIG. 14.

An advantage of the invention will be found in an additional means for eliminating possible erroneous result in the numeral wheels or register. In a key-responsive machine, such as of the type referred to above, depression of a digit key (25 herein) causes digital actuation of the accumulator by an electric motor such as 317 herein. As will be seen from the circuit of FIG. 14, the circuit to the motor (317) is open during the cycling operation, and any further key-depression therefor will be a nullity. This arrangement results in a safeguard against the depression of a key, such as may happen by accidentally striking with the hand or otherwise, causing movement of the numeral wheels during a cycling operation and hence resulting in the transfer of an erroneous result.

Operation of the recording means is selectively independent of, or responsive to, that of the calculating machine. Transfer of the result is made independently of the zeroizing operation, and can be made any desired number of times for a given result registered in the calculating machine.

Transfer or recordation of information in accordance with the foregoing may be supplementary to independent use of the typewriter or "Teletype" each of which may be used as an instrument independent of the calculating machine.

Subtotals in the calculating machine may be transferred and recorded at any time without zeroizing or otherwise affecting the functioning of the calculating machine.

It is thought that the invention and its attendant advantages will be understood from the foregoing description, and it will be apparent that various changes may be made in the form, construction and arrangement of the parts without departing from the spirit and scope of the invention or sacrificing all of its material advantages, the form hereinbefore described and illustrated in the drawing being merely a preferred embodiment thereof.

I claim:

1. In apparatus of the character disclosed, a calculator having a plurality of denominational orders of registering means, a numeral bearing result wheel in each order, a switch operated by each result wheel, recording means including a plurality of electrically operated character impressing elements, circuit means for connecting said switches with selected ones of said character impressing elements, reading means reading said switches sequentially from the highest order to the lowest, manually actuated switch means for controlling said reading means, and switch means controlled by the lowest order result wheel in series with and controlling said first switches and said manually actuated switch means.

2. In apparatus of the character disclosed, a calculating machine having a plurality of denominational orders of registering means, a result wheel for each order, each wheel having a normal zero position, means responsive to the position of the result wheels for blanking ciphers in all orders to the left of the highest significant digit, a rotary switch individual to each order settable by the respective result wheel to a position corresponding to that of the result wheel, a second switch associated with each order in series with the respective rotary switch and controlled by the blanking means of the order, recording means including electrically operated character impressing elements, and circuit means individual to the orders for connecting said rotary switches in circuit with selected ones of said character impressing elements, said blanking means and circuit means being operative for completing circuit through the circuit means associated with the significant digit orders and disabling the circuit means associated with the orders to the left of the highest significant digit.

3. In apparatus of the character disclosed, a calculating machine having a plurality of denominational orders of registering means, a numeral bearing result wheel for each order having a normal zero position and movable to advanced positions, means for moving each wheel to advanced positions, a blanking member for each wheel movable by the respective wheel moving means through a limited arc between a first position for indicating a blank and a second position for indicating a cipher, a rotary multi-point switch driven by each wheel to a position corresponding to the position of the wheel, a second switch individual to each order in series with the respective rotary switch having a normal open position and having an arm engageable by the respective blanking member and movable to closed position by the blanking member in movement of the latter from its said first position to its said second position, recording means including a plurality of electrically operated character impressing elements, and electrical control means for selectively connecting said character impressing elements in circuit with said rotary switches serially with respect to the latter.

4. In apparatus of the character disclosed, a key-responsive calculating machine having a plurality of denominational orders of registering means, means for actuating said registering means in response to actuation of corresponding keys, rotary switches individual to said orders settable by said registering means to positions corresponding to the positions of the registering means, recording means, electrically controlled means for transferring numbers from said registering means to said recording means and controlled by said rotary switches, said electrically controlled means being operative for so transferring numbers serially of said denominational orders, common means for zeroizing said registering means and rotary switches and means included in said electrically controlled means for blocking said zeroizing means during the transferring and recording operation.

5. In apparatus of the character disclosed, a key-responsive calculating machine having a plurality of denominational orders of registering means, a result wheel for each order having a normal position and movable to adance positions, means for actuating said result wheels, means for blanking all result wheels in orders higher than the highest significant digit, and movable to indicating positions in the significant digit orders by the result wheel actuating means in the latter orders, a recording machine including a tape and a plurality of punches operated by solenoids, said punches being operated in various combinations for forming apertures in the tape for representing characters such as numerals and machine functions such as spacing operations, and circuit and control means including sensing means operative for reading the orders sequentially and controlled by said blanking means for operating the punches to represent a spacing operation for each order higher than the highest significant digit and a numerical value for each significant digit order.

6. In apparatus of the character disclosed, a key-responsive calculating machine having a plurality of denominational orders, registering means in each order, each having a normal zero position and movable to advanced positions in response to actuation of a corresponding key, a visual indicator for each registering means movable between a first position in which it negates the appearance of a zero when the corresponding registering means is in its zero position, and a second position in which it visually indicates a zero when the corresponding registering means is in its zero position, means moving said indicators to their said first positions in response to all said registering means moving to their zero positions and normally retaining the indicating means in such position, means moving said indicators in all significant digit orders to their said second position in response to movement of the registering means in the highest significant digit order to an advanced position, recording means including at least one character impressing element corresponding to each of said orders, means for actuating said character impressing elements, means for reading said orders serially, and means operatively interposed between said reading means and character impressing elements and controlled by said visual indicators for de-energizing the character impressing elements corresponding to those orders to the left of the highest significant digit order and energizing those of the significant digit orders.

7. In apparatus of the character disclosed, a key-responsive calculating machine having a plurality of denominational orders, registering means in each order, each having a normal zero position and movable to advance positions in response to actuation of a corresponding key, a visual indicator for each registering means movable between a first position in which it negates the appearance of a zero when the corresponding registering means is in its zero position, and a second position in which it visually indicates a zero when the corresponding registering means is in its zero position, means moving said indicators to their said first positions in response to all said registering means moving to their zero positions and normally retaining the indicating means in such positions, and means moving said indicators in all significant digit orders to their said second position in response to movement of the registering means in the highest significant digit order to an advanced position, recording means including at least one electrically operated character impressing element corresponding to each of said orders, means for reading said orders serially and placing the character impressing elements in circuit, and a switch corresponding to each order and controlled by the corresponding visual indicating element, said visual indicating elements being operative when in said first position for energizing the respective circuit including the corresponding character impressing elements and when in said second position for opening the circuit to the corresponding character impressing elements.

8. In apparatus of the character disclosed, a key-responsive calculating machine having a plurality of denominational orders and a registering means in each order, each registering means having a normal zero position and being movable between that position and advanced value-indicating positions, means operable in response to actuation of a corresponding key for moving the registering means to said advanced positions, means for zeroizing them to their normal position, a visual indicating member for each order movable between a non-indicating position and an indicating position, each being movable to its said indicating position in response to the respective registering means moving to an advanced position, and each indicating member being operative, on moving to indicating position, for moving to indicating position all those indicating members in the orders to the right thereof, switch means associated with each order moved from a normal first position to a second position by the associated indicating member in response to the latter moving to indicating position for setting up circuit including selected ones of said character impressing elements, said switches moving to their said first position in response to the respective indicating members moving to the non-indicating position, reading means for serially placing said switches in circuit for operating the corresponding character impressing elements, and manually controlled means for operating said reading means through a predetermined cycle.

9. The apparatus set out in claim 8 in which, when the switches are in their said second position, the respective circuits are set up for impressing selected characters, and when they are in their said first position, the respective circuits are set up for effecting spacing operations.

10. In apparatus of the character disclosed, a key-responsive calculating machine having a plurality of denominational orders each having keys indicating 1 to 9 and registering means, each registering means including a numeral wheel having numerals including 0 thereon and being movable between a normal position in which the 0 is in position for viewing and advanced positions for selectively presenting the numerals 1 to 9 to viewing positions, means controlled by movement of the numeral wheels for automatically blanking all numeral wheels to the left of the highest significant digit, said numeral wheels being individual to the orders and permanently related thereto, first switches individual to said denominational orders each having a plurality of points corresponding to the numerals of the numeral wheels and being settable by the wheels and to positions corresponding to the respective positions of the wheels, and being movable only by the numeral wheels, recording means including character impressing elements and electromagnets for operating the latter, a plurality of second switches including at least a switch individual to each of the first switches for connecting said electromagnets selectively with the set points of the first switches, means operative in a single cycle of operation for actuating the second switches serially relative to the denominational orders of the machine, additional switches individual to the orders and controlled by the blanking means, said additional switches being operative for controlling the respective character impressing elements and preventing actuation thereof as controlled by said first switches in orders to the left of the highest significant digit, and control means operative upon momentary energization thereof for operating said actuating means through a single complete cycle.

11. The apparatus of claim 10 including circuit means for connecting said first switches and electromagnets of the character impressing elements in selected combination, electrically operated means for shifting said record medium in step-by-step fashion along a line one increment at a step, and means including invariable circuit means for actuating said shifting means one step for each blanked order throughout one cycle.

References Cited in the file of this patent

UNITED STATES PATENTS

| | | |
|---|---|---|
| 1,834,561 | Watson | Dec. 1, 1931 |
| 1,942,106 | Kottmann | Jan. 2, 1934 |
| 2,084,445 | Kottmann | June 22, 1937 |
| 2,231,215 | Noxon et al. | Feb. 11, 1941 |
| 2,309,069 | Sobisch | Jan. 19, 1943 |
| 2,493,709 | Wittenmyer | Jan. 3, 1950 |
| 2,580,693 | Mueller | Jan. 1, 1952 |
| 2,633,222 | Wittenmyer | Mar. 31, 1953 |
| 2,728,521 | Benson et al. | Dec. 27, 1955 |
| 2,756,823 | Laville et al. | July 31, 1956 |
| 2,812,902 | Runde et al. | Nov. 12, 1957 |

FOREIGN PATENTS

| | | |
|---|---|---|
| 756,877 | Germany | May 21, 1952 |
| 707,283 | Great Britain | Apr. 14, 1954 |

OTHER REFERENCES

Friden Add-Punch Machine-Mechanical Operation and Adjustment Manual, copyright 1955.

UNITED STATES PATENT OFFICE
CERTIFICATE OF CORRECTION

Patent No. 3,022,939                            February 27, 1962

Andrew Flagge

It is hereby certified that error appears in the above numbered patent requiring correction and that the said Letters Patent should read as corrected below.

Column 2, line 15, for "latter" read -- letter --; column 3, line 63, for '"comptometer"' read -- "Comptometer" --; same line 63, for "incudes" read -- includes --; column 5, line 21, for "from meshing relationship with the transmitting" read -- , and the numeral wheel gears, will return every --.

Signed and sealed this 3rd day of July 1962.

(SEAL)
Attest:

ERNEST W. SWIDER                          DAVID L. LADD
Attesting Officer                            Commissioner of Patents